United States Patent
Angell et al.

(10) Patent No.: US 7,791,482 B2
(45) Date of Patent: Sep. 7, 2010

(54) USING RFIDS TO DETECT MATERIAL DILUTION

(75) Inventors: Robert L. Angell, Salt Lake City, UT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 12/052,548

(22) Filed: Mar. 20, 2008

(65) Prior Publication Data

US 2009/0237250 A1 Sep. 24, 2009

(51) Int. Cl.
*G08B 13/14* (2006.01)
(52) U.S. Cl. ............ 340/572.1; 340/572.2; 340/572.3; 340/572.4; 340/572.5; 340/572.6; 73/32 R; 73/440; 73/450; 73/54.01; 73/54.07; 702/45; 702/55; 702/23; 702/26; 702/128

(58) Field of Classification Search ... 340/572.1–572.8; 73/32 R, 440, 450, 54.01, 54.07, 54.13, 54.14, 73/61.42, 61.91; 702/45–55, 23–26, 128–129, 702/137
See application file for complete search history.

(56) References Cited

U.S. PATENT DOCUMENTS

2005/0212675 A1* 9/2005 Green ............... 340/572.8
2008/0252483 A1* 10/2008 Hodges ............ 340/905

* cited by examiner

*Primary Examiner*—Davetta W Goins
*Assistant Examiner*—Ojiako Nwugo
(74) *Attorney, Agent, or Firm*—Dillon & Yudell LLP

(57) ABSTRACT

A material is laced with Radio Frequency Identification (RFID) tags at a known concentration of RFID tags per unit of material. Subsequently, if an interrogation of the RFID tags reveals a reduced concentration of RFID tags in the material, then a conclusion is drawn that the material has been diluted.

20 Claims, 5 Drawing Sheets

USING RFIDS TO DETECT MATERIAL DILUTION

BACKGROUND OF THE INVENTION

1. Technical Field

The present disclosure relates to the field of material, and specifically to quality control of materials. Still more particularly, the present disclosure relates to electronically performing a quality control monitoring of material using electronic identification devices.

2. Description of the Related Art

When material arrives at a facility, it is often necessary to confirm the quality of the material. This quality confirmation includes determining if the material has been tampered with, including dilution. That is, it may be that the material left a manufacturer/distributor at a certain quality (concentration), but by the time it arrives at the customer's site, the material may be have been siphoned off and diluted with an inexpensive material (e.g., water).

Quality control of materials being received at the facility is often accomplished through the use of difficult, time-consuming and expensive processes, which may involve the use of complex assaying equipment (e.g., a Mass Spectrometer/Gas Chromatograph (MS/GC)). This type of equipment is expensive, non-portable, and must be operated by highly-trained technicians.

SUMMARY OF THE INVENTION

A material is laced with Radio Frequency Identification (RFID) tags at a known concentration of RFID tags per unit of material. Subsequently, if an interrogation of the RFID tags reveals a reduced concentration of RFID tags in the material, then a conclusion is reached that the material has been diluted.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
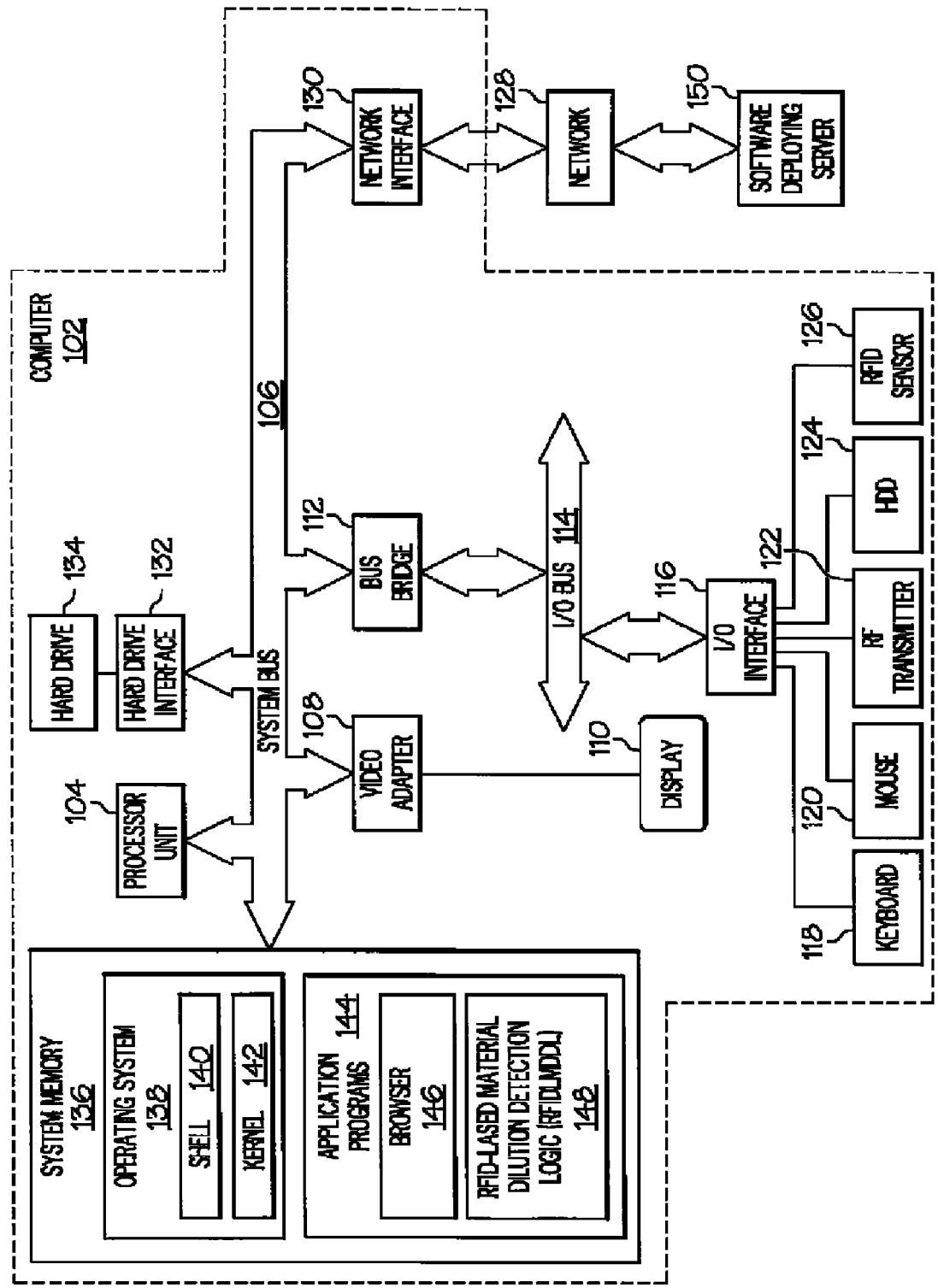
FIG. 1 depicts an exemplary computer which may be utilized by the present invention.

With reference now to the figures, and in particular to FIG. 1, there is depicted a block diagram of an exemplary computer 102, which the present invention may utilize. Note that some or all of the exemplary architecture shown for computer 102 may be utilized by software deploying server 150.

Computer 102 includes a processor unit 104, which may utilize one or more processors each having one or more processor cores, that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Radio Frequency (RF) transmitter 122, a Hard Disk Drive (HDD) 124, and a Radio Frequency Identification (RFID) sensor 126. It is recognized that RF transmitter 122 and RFID sensor 126 should be protected from one another, by being physically separated by distance or a shield (not shown), in order to enable proper functionality of the RFID sensor 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a RFID-Laced Material Dilution Detection Logic (RFIDLMDDL) 148. RFIDLMDDL 148 includes code for implementing the processes described below, and particularly as described in FIGS. 4-7. In one embodiment, computer 102 is able to download RFIDLMDDL 148 from software deploying server 150, including in an on-demand basis. Note further that, in one embodiment of the present invention, software deploying server 150 performs all of the functions associated with the present invention (including execution of RFIDLMDDL 148), thus freeing computer 102 from having to use its own internal computing resources to execute RFIDLMDDL 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

In an exemplary embodiment, the present invention utilizes Radio Frequency Identification (RFID) tags to determine if a material has been diluted, either surreptitiously or in an authorized manner. As known to those skilled in the art, an RFID tag may be active (i.e., battery powered), semi-passive (i.e., powered by a battery and a capacitor that is charged by an RF interrogation signal), or purely passive (i.e., either have a capacitor that is charged by an RF interrogation signal or are geometrically shaped to reflect back specific portions of the RF interrogation signal). Passive RFID tags may contain an on-board Integrated Circuit (IC) chip, or they may be chipless.

Figure 2:
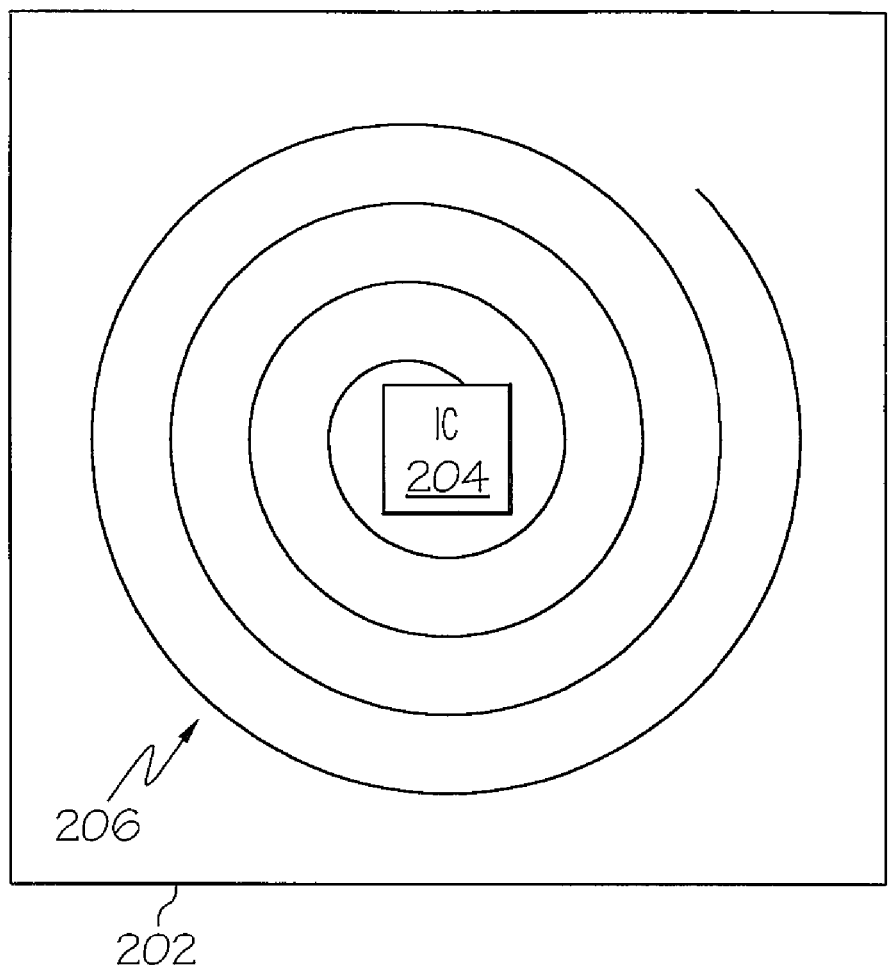
FIG. 2 illustrates an exemplary chip-enabled Radio Frequency Identification (RFID) tag that may be used by the present invention.

Referring now to FIG. 2, an exemplary RFID tag 202 having an on-board IC chip is made up of two components: the IC chip 204 and a coupled antenna 206. The IC chip 204 stores and processes information, including Electronic Product Code (EPC) information that describes an associated material into which the IC chip 204 is laced. This information includes, but is not limited to, the name (e.g., trade name, chemical composition name in accordance with naming protocols of the International Union of Pure and Applied Chemistry (UIPAC), etc.) of the material, the name of the manufacturer of the material, emergency (fire, health safety) information for the material, etc. Note that the EPC information may be for a component material that is part of a composition of materials, or it may describe the composition of materials themselves (e.g., identifies all materials that are combined to make up a compound). The IC chip 204 may contain a low-power source (e.g., a capacitor, not shown, that is charged by an interrogation signal received by the coupled antenna). Upon the capacitor being charged, the IC chip 204 then generates a radio signal, which includes the EPC information, to be broadcast by the coupled antenna 206.

Figure 3:
FIG. 3 depicts an exemplary chipless RFID tag that may be used by the present invention.

As depicted in FIG. 3, the same principles described above for RFID tag 202 may also be applied to a chipless RFID tag 302. Chipless RFID tag 302, as the name implies, does not have an IC chip, but is only an antenna that is shaped to reflect back a portion of an interrogation RF signal. That is, chipless RFID tag 302 (also known as a Radio Frequency (RF) fiber) is physically shaped to reflect back select portions of a radio interrogation signal from an RF transmission source. Chipless RFID tag 302 typically has a much shorter range than an RFID chip that includes an on-board IC chip, such as RFID tag 202. Furthermore, the amount of information that chipless RFID tag 302 can store and return is much smaller than that of RFID tag 202 with its on-board IC chip.

Figure 4:
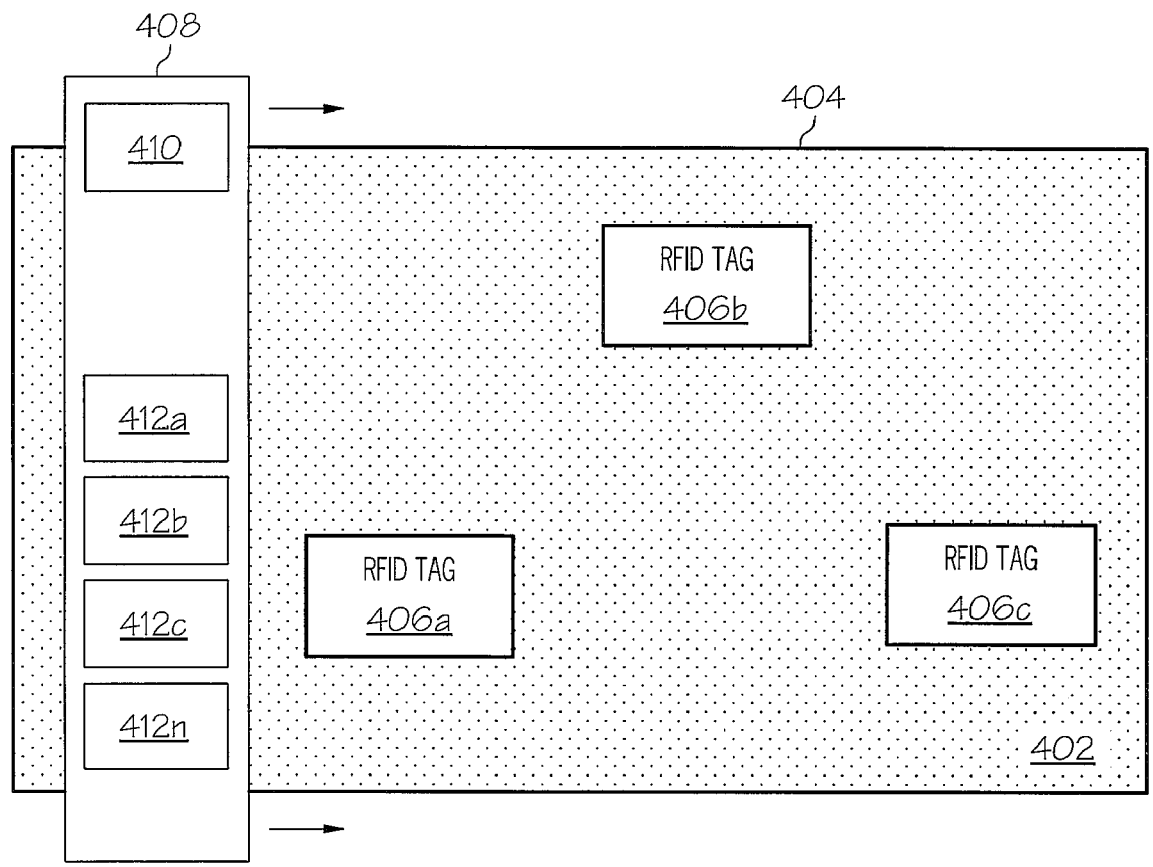
FIG. 4 illustrates a material that is laced with RFID tags in an unbound colloidal manner.

With reference now to FIG. 4, assume that a material 402, which is shown here in a container 404, is laced with multiple RFID tags 406a-c. Also assume that the material was initially laced with multiple RFID tags (including the RFID tags 406a-c) at an earlier time at a known concentration. Thus, by interrogating the RFID tags 406a-c in material 402 with an RFID interrogator 408, (which includes an RF transmitter 410, analogous to the RF transmitter 122 shown in FIG. 1, and one or more RFID sensors 412a-n, analogous to the RFID sensor 126 shown in FIG. 1), a determination can be made as to the present concentration of RFID tags 406a-c in the material 402.

For the purpose of further illustration, then, assume that the container 404 holds one liter of material 402, and that the RFID interrogator 408 has detected three RFID tags (RFID tags 406a-c) that identify the material 402. Assume also that it is known that the material 402 was initially laced (by a manufacturer, distributor, other user, etc.) with six RFID tags (including the three RFID tags 406a-c plus three additional RFID tags having the same signature) per liter of material 402. A conclusion can thus be drawn that the material 402 has been diluted by 50%, assuming an initial uniform distribution of RFID tags in the material 402.

It is understood that the signatures (which may include the EPC information described above, or may simply by an identifier of the RFID tags themselves, thus allowing the RFID tags to be laced into any material) are determined by transmitting an RF interrogation signal from the RF transmitter 410. The RFID tags 406a-c, which may be chip-enabled or chipless (as described above in FIGS. 2-3), then respond with the (digital) signature associated with those chips. These signatures are received by the array of RFID sensors 412a-n, which are able to differentiate the returning signals from the RFID tags 412a-n in order to accurately count how many RFID tags 412a-n are in the sample of material 402.

Note that the RFID tags 406a-c depicted in FIG. 4 are not shown to scale. That is, the RFID tags 406a-c are preferably small (i.e., less than 0.5 mm×0.5 mm), in order to allow them to flow freely and without clogging piping. In one embodiment, the RFID tags 406a-c remain uniformly mixed throughout the material 402. If the material 402 is a dry particulate matter (e.g., dry chemicals), then the RFID tags 406a-c will naturally remain in a dispersed orientation. However, if the material 402 is a liquid (e.g., an emulsion or liquid), then a buoyancy coating (not shown) around the RFID tags 406a-c may be needed to give the RFID tags a same specific gravity as the material 402.

Figure 5:
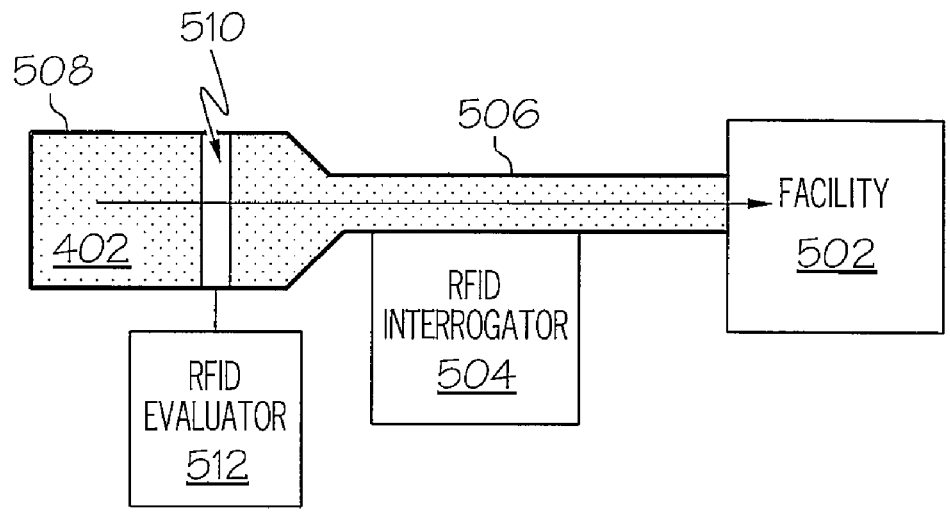
FIG. 5 depicts a tapered inlet line used to enable detection of RFID tags in a piping.

Referring now to FIG. 5, another method for determining the concentration of RFID tags in material 402 is presented. Assume that the material 402 (still laced with the RFID tags 406 shown in FIG. 4) is entering a facility 502 (i.e., a chemical plant, a manufacturing facility, a storage facility, a processing unit in a chemical plant, etc.) through piping 506. As the material 402 passes through the narrowed piping 506, the RFID tags 406 are detected by an RFID interrogator 504. RFID interrogator 504 utilizes an architecture substantially described in FIG. 1 for computer 102. That is, RFID interrogator 504 includes an RF transmitter 122 and at least one RFID sensor 126, which interrogates the passing RFID tags 406 as they enter the facility 502. This interrogation is accomplished by transmitting an RF interrogation signal from an RF transmitter (e.g., RF transmitter 122 shown in FIG. 1) in the RFID interrogator 504 to the RFID tags 406, which then respond (to RFID sensor 126 shown in FIG. 1) with ID data for either RFID tags 406 themselves, or else data that is specific for the material 402. Note that RFID interrogator 504 is positioned against piping 506, which has been narrowed (tapered, necked) down from piping 508. That is, piping 508 is so large in diameter that RFID tags 406 in the middle of the inlet piping 508 would be unable to be "heard" by the RFID interrogator 504 if RFID interrogator 504 were placed next to the larger diameter piping 508.

Figure 6:
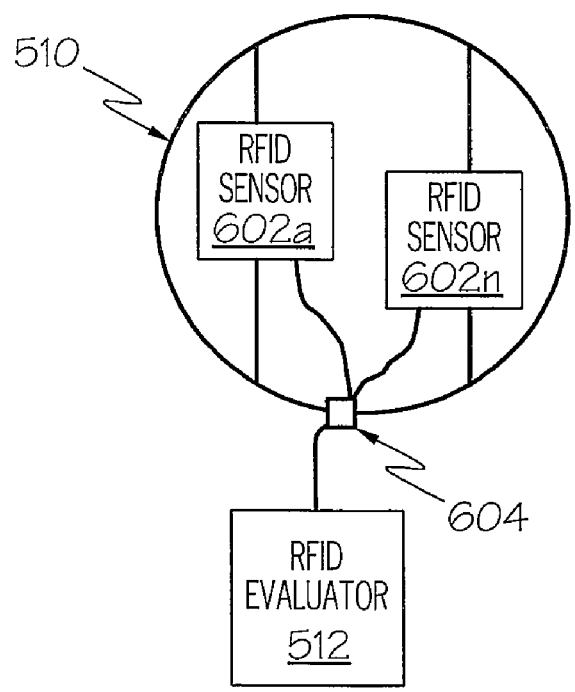
FIG. 6 illustrates detail of a grid, with attached RFID sensors, which is internal to a piping shown in FIG. 5.

Another solution to detecting all RFID tags 406 is presented by grid 510 and RFID evaluator 512. Grid 510 is a (rigid, semi-rigid or flexible) grid that is mounted within piping 508 in a traverse manner (i.e., where the face of the grid 510 is perpendicular to the flow of the bulk material 402). The grid 510 is preferably made of material that is both impervious (non-reactive, non-corrosive, etc.) to the bulk material 402, and also poses no electrical interference (including RF shielding) to the RFID tags 406. Mounted on the grid 510 are multiple RFID sensors 602*a-n* (where "n" is an integer, as shown in FIG. 6), which are coupled via a sealed coupler 604 (that permits power and data communication to flow between the RFID sensors 602*a-n* and an RFID evaluator 512 without allowing the bulk material 402 to escape the piping 508) to RFID evaluator 512. The RFID evaluator 512 is substantially similar to the architecture shown in FIG. 1 for computer 102, except that the RFID sensors 602*a-n* (analogous to RFID sensor 126 shown in FIG. 1) are external to the computer 102.

Figure 7:
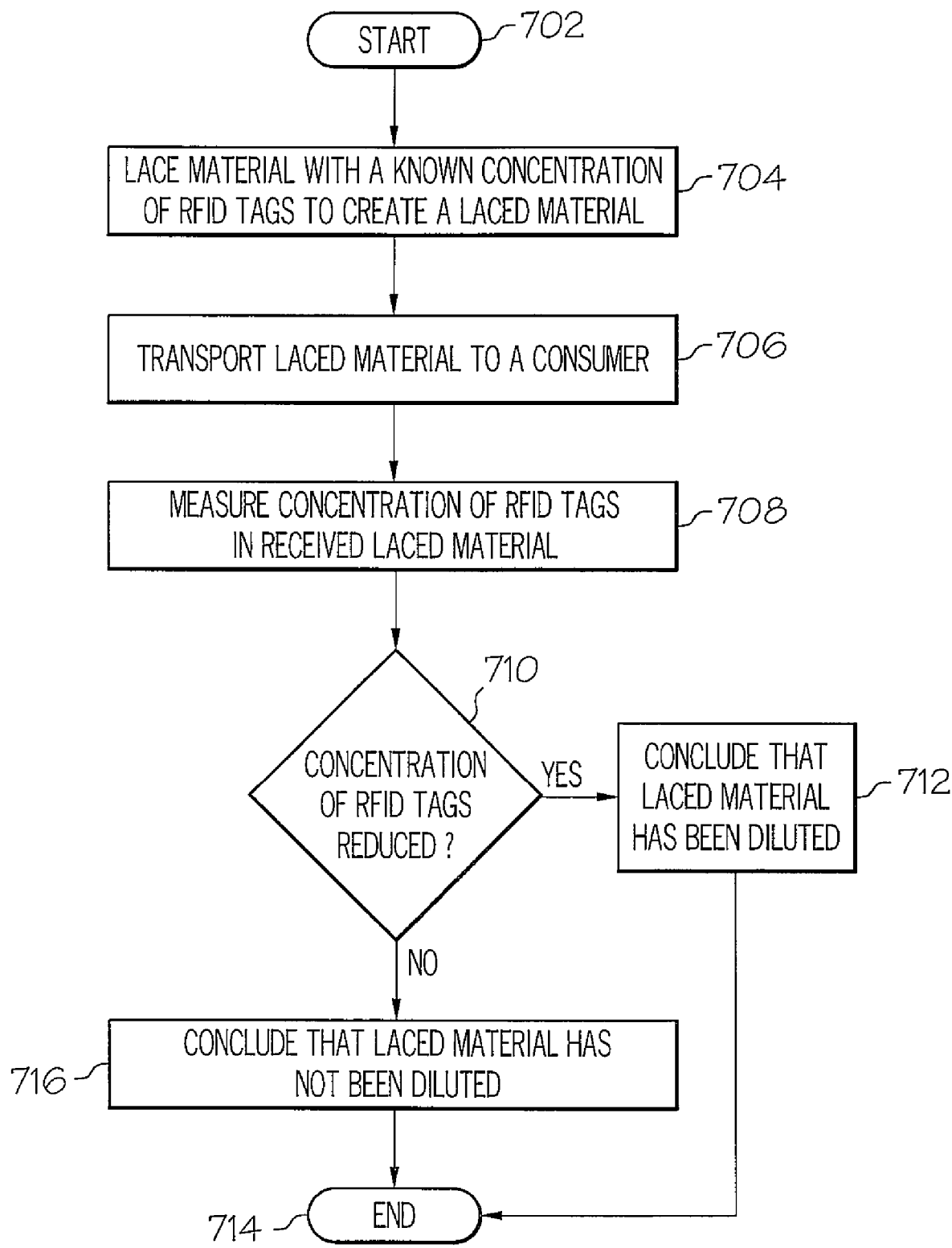
FIG. 7 is a high-level flow-chart of exemplary steps taken to determine if a material has been diluted by checking for a change in RFID tag concentration in the material.

With reference now to FIG. 7, a high-level flow-chart of exemplary steps taken to determine if a material has been diluted is presented. After initiator block 702, a material is laced with RFID tags in a known concentration (block 704). This lacing is preferably done in an unbound unattached manner, such that a colloidal state is established between the material (which is free-flowing and unpackaged) and the RFID tags. Therefore, the concentration of RFID tags can be used at any time to determine if the material has been diluted, even though the material is no longer packaged.

As depicted in block 706, the material is then transported to a consumer (e.g., a facility, such as, but not limited to, a chemical plant, a manufacturing plant, etc.). At the facility, the concentration of RFID tags in the material is determined by counting how many RFID tags are in a certain quantity of material. If the concentration of RFID tags has been reduced (query block 710), then a conclusion is drawn that the material has been diluted (block 712), and the process ends (terminator block 714). If the concentration of RFID tags at the facility is the same as the initial concentration established by the supplier of the material, then a conclusion is drawn that the material has not been diluted (block 716).

Note that while RFID tags (including RFID tags 406*a-c*) are depicted, named and described above as RFID tags, it is understood that the concept of monitoring for dilution of material, as described above in the present invention, may be applied to any electronic device whose functionality is to provide a digital signature for a material. Thus, devices may include, but are not limited to, simple electronic devices such as charged capacitors, etc.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of detecting a tampering of a material, the method comprising:
    taking a sample of a material that has been laced with Radio Frequency Identification (RFID) tags in a known initial RFID concentration;
    interrogating the RFID tags in the material with an RF interrogation signal;
    reading RFID identification signals from the material to determine a current RFID concentration in the material;
    comparing the known initial RFID concentration with the current RFID concentration; and
    in response to determining that the current RFID concentration is less than the known initial RFID concentration, concluding that the material has been diluted.

2. The method of claim 1, wherein the material is laced with the RFID tags in an unbound colloidal state.

3. The method of claim 2, wherein the material is a liquid.

4. The method of claim 2, wherein the material is a solid mixture.

5. The method of claim 1, wherein the material is a component that is combined with other known materials to create a composite material.

6. The method of claim 1, wherein the material was laced with the RFID tags at a remote location, wherein the material was transported from the remote location to the facility, and wherein the material is sampled after being delivered to the facility.

7. The method of claim 1, wherein the sample of material is taken from a storage container that is located at the facility.

8. A method of marking a material to facilitate quality control of the material, the method comprising:
    lacing a material with Radio Frequency Identification (RFID) tags in a known initial RFID concentration, wherein the material, when received at a facility, is capable of being interrogated with an RF interrogation signal to determine a current RFID concentration in the material, and wherein in response to the current RFID concentration being less than the known initial RFID concentration, a determination is made that the material has been diluted.

9. The method of claim 8, wherein the material is laced with the RFID tags in an unbound colloidal state.

10. The method of claim 9, wherein the material is a liquid.

11. The method of claim 9, wherein the material is a solid mixture.

12. The method of claim 8, wherein the material is a component that is combined with other known materials to create a composite material.

13. The method of claim 8, wherein the material was laced with the RFID tags at a remote location, the method further comprising:

transporting the material from the remote location to a facility, wherein the RFID tags are interrogated at the facility.

14. A plurality of electronic signature devices used to determine if a material has been diluted, wherein each of the electronic signature devices comprises:

a signature storage structure for storing a digital signature; and a transmitter for transmitting the digital signature in response to an electronic interrogation signal, wherein the electronic signature devices are laced in a material at a known electronic signature device concentration, wherein a subsequent interrogation of the electronic signature devices will reveal that the material has been diluted if the subsequent interrogation indicates a reduced concentration of the electronic signature devices in the material.

15. The plurality of electronic signature devices of claim 14, wherein the electronic signature devices are Radio Frequency Identification (RFID) tags.

16. The plurality of electronic signature devices of claim 15, wherein the material is laced with the RFID tags in an unbound colloidal state.

17. The plurality of electronic signature devices of claim 16, wherein the material is a liquid.

18. The plurality of electronic signature devices of claim 16, wherein the material is a solid mixture.

19. The plurality of electronic signature devices of claim 14, wherein the material is a component that is combined with other known materials to create a composite material.

20. The plurality of electronic signature devices of claim 14, wherein the material was laced with the electronic signature devices at a remote location, wherein the material was transported from the remote location to the facility, and wherein the material is sampled after being delivered to the facility.

* * * * *